United States Patent
Hutchison et al.

(10) Patent No.: US 7,249,191 B1
(45) Date of Patent: Jul. 24, 2007

(54) TRANSPARENT BRIDGE THAT TERMINATES TCP CONNECTIONS

(75) Inventors: Paul Hutchison, Oakland, CA (US); Cameron Smith, Redwood City, CA (US); Vilis Ositis, Sunol, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 402 days.

(21) Appl. No.: 10/251,101

(22) Filed: Sep. 20, 2002

(51) Int. Cl.
    *G06F 15/16* (2006.01)

(52) U.S. Cl. ...................... 709/236; 709/245

(58) Field of Classification Search ........... 709/236, 709/245
    See application file for complete search history.

(56) References Cited

U.S. PATENT DOCUMENTS

| | | | | |
|---|---|---|---|---|
| 5,781,550 A | * | 7/1998 | Templin et al. | 370/401 |
| 5,915,087 A | * | 6/1999 | Hammond et al. | 726/12 |
| 6,006,264 A | * | 12/1999 | Colby et al. | 709/226 |
| 6,507,643 B1 | * | 1/2003 | Groner | 379/88.14 |
| 6,731,604 B1 | * | 5/2004 | Chugo et al. | 370/238 |
| 6,745,243 B2 | * | 6/2004 | Squire et al. | 709/227 |
| 6,778,540 B1 | * | 8/2004 | Ratcliff et al. | 370/401 |
| 6,944,706 B2 | * | 9/2005 | Schain et al. | 710/312 |
| 6,950,877 B2 | * | 9/2005 | Asano et al. | 709/238 |
| 7,031,297 B1 | * | 4/2006 | Shabtay et al. | 370/352 |
| 2001/0023451 A1 | * | 9/2001 | Hericourt | 709/232 |
| 2002/0015387 A1 | * | 2/2002 | Houh | 370/250 |
| 2002/0038339 A1 | * | 3/2002 | Xu | 709/203 |
| 2003/0106067 A1 | * | 6/2003 | Hoskins | 725/119 |
| 2003/0161333 A1 | * | 8/2003 | Schain et al. | 370/401 |

* cited by examiner

*Primary Examiner*—David Wiley
*Assistant Examiner*—J. Bret Dennison
(74) *Attorney, Agent, or Firm*—Sonnenschein Nath & Rosenthal LLP (57) ABSTRACT

A multi-application transparent platform intercepts an incoming application file communicated from a source across a first TCP connection by terminating the first TCP connection on the multi-application transparent platform and supplying the application file to an application program. The application file is received onto the platform in the form of multiple incoming Ethernet frames. The application layer program analyzes the application file and identifies characteristics of the application file, such as virus content, that are not apparent in the individual Ethernet frames that carried the application file over the first TCP connection. The platform resends the application file over a second TCP connection in outgoing frames having the same IP addresses and Ethernet MAC addresses as the incoming frames. The platform can be inserted into a running network without reconfiguring devices on the network.

20 Claims, 10 Drawing Sheets

TRANSPARENT BRIDGE THAT TERMINATES TCP CONNECTIONS

TECHNICAL FIELD

The present invention relates to intercepting and resending messages transparently over a transport layer. More specifically, the invention relates to a platform that executes application layer programs transparently on the messages.

BACKGROUND

Figure 1:
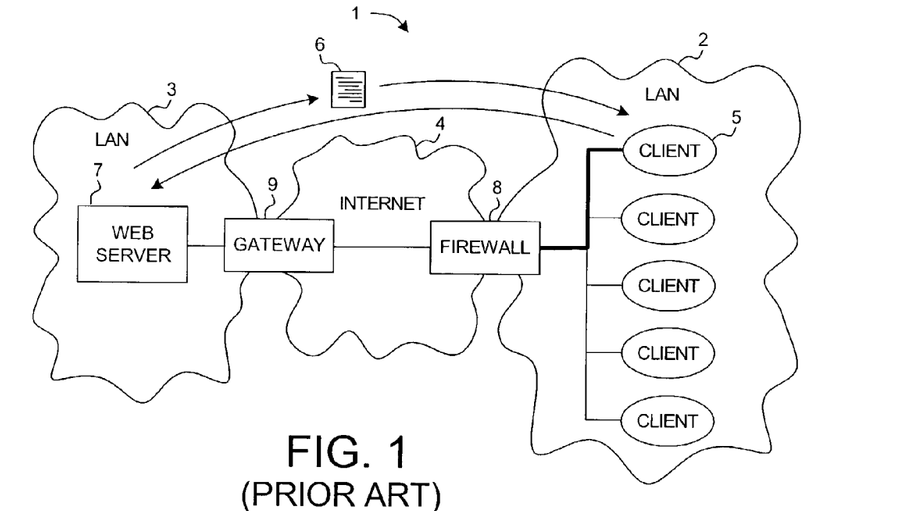
FIG. 1 (prior art) is a diagram of a client connected to a web server through a filtering firewall.

FIG. 1 (prior art) is a diagram of an internetwork 1 including two local area networks (LANs) 2 and 3 connected by the Internet 4. A client 5 on LAN 2 wishes to retrieve a webpage 6 from a web server 7 on LAN 3. The client 5 makes a request for the webpage 6 through a filtering firewall 8.

Figure 2:
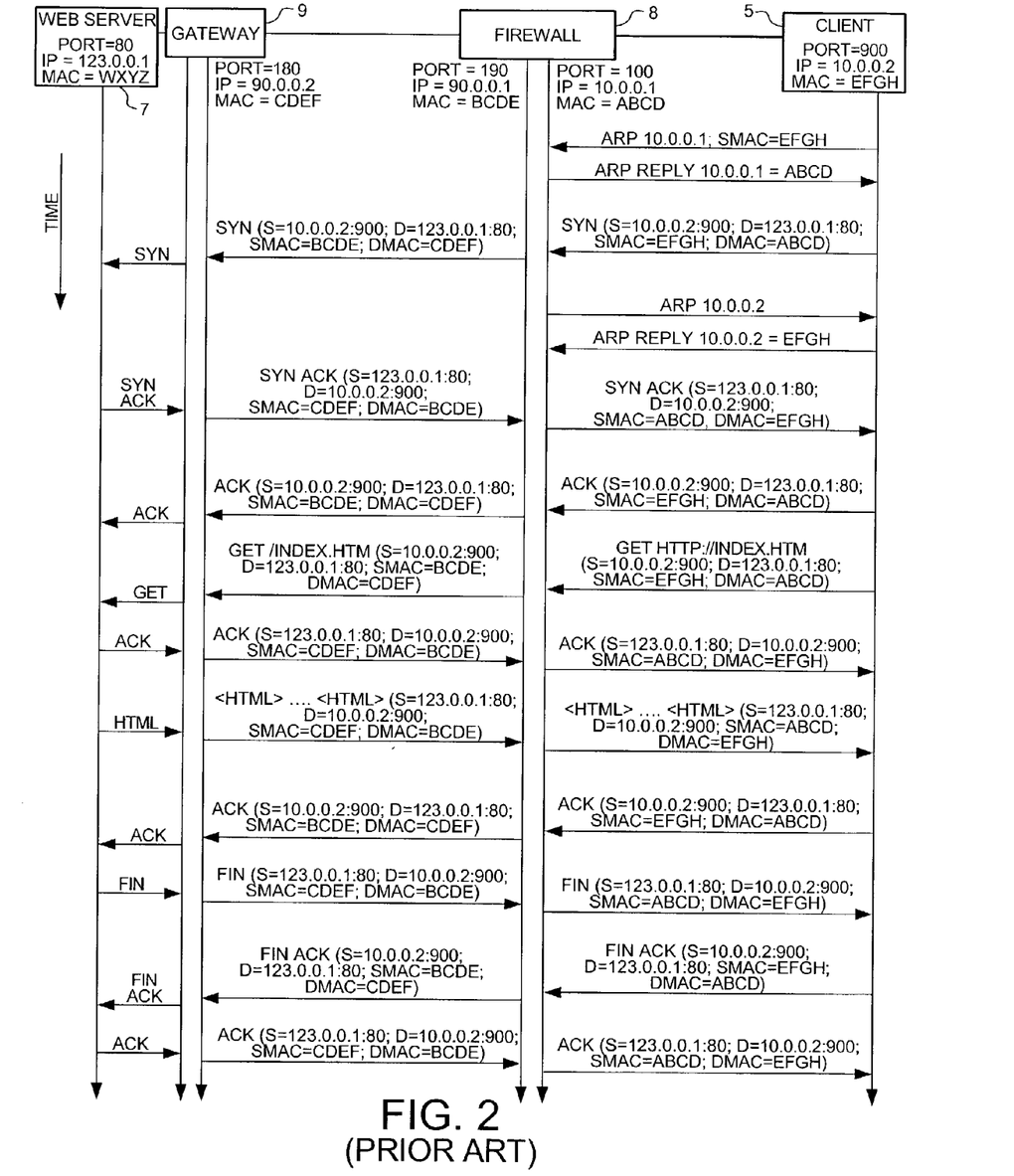
FIG. 2 (prior art) is a diagram showing protocol messages used to set up a TCP connection between the client and the web server of FIG. 1.

FIG. 2 (prior art) is a diagram showing the Ethernet/IP/TCP protocol messages used to set up the connection between client 5 and web server 7 and to send the webpage 6. Firewall 8 provides a level of security for messages entering LAN 2 by filtering out certain of those messages based upon the content of Ethernet frames. Firewall 8 is generally unable, however, to analyze application level data as a unit, such as executable files received in multiple messages and Ethernet frames.

Figure 3:
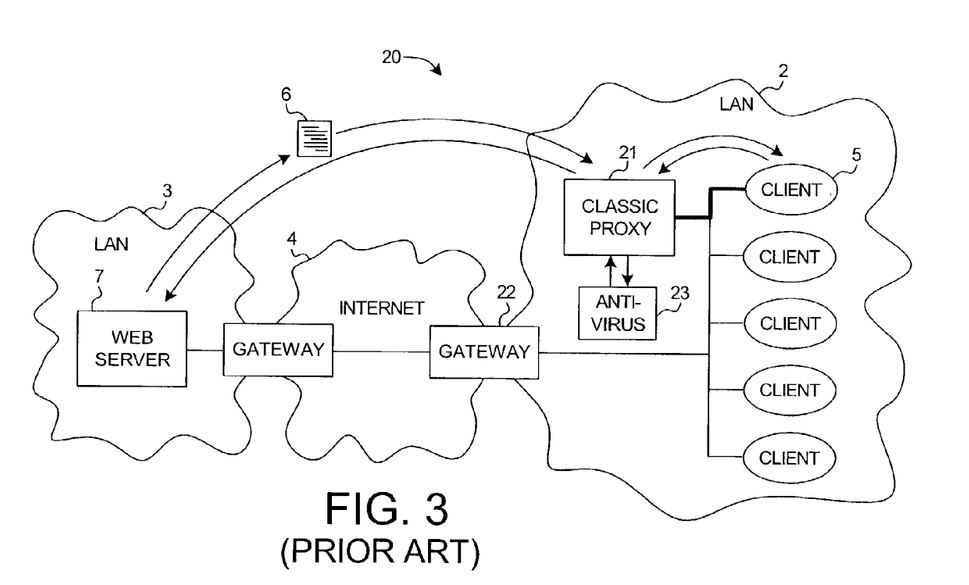
FIG. 3 (prior art) is a diagram of a client connected to a web server through a proxy server executing an anti-virus application.

FIG. 3 (prior art) is a diagram of an internetwork 20, also including LANs 2 and 3 and Internet 4. In order to analyze application level data passing into LAN 2, a classic proxy 21 is used to send messages from client 5 through a gateway 22 and out of LAN 2. Client 5 makes a request for the webpage 6 to the classic proxy 21 instead of directly to the web server 7. Classic proxy 21, in turn, makes a new request for web page 6 to web server 7 on behalf of client 5. Web server 7 returns webpage 6 to classic proxy 21. Classic proxy 21 forwards the webpage 6 to client 5. Because the complete application level data in the form of webpage 6 is received onto classic proxy 21, application level anti-virus software 23 executing on the classic proxy 21 can analyze application level data, such as a complete execute file, and not forward the data to client 5 if a virus is detected.

Figure 4:
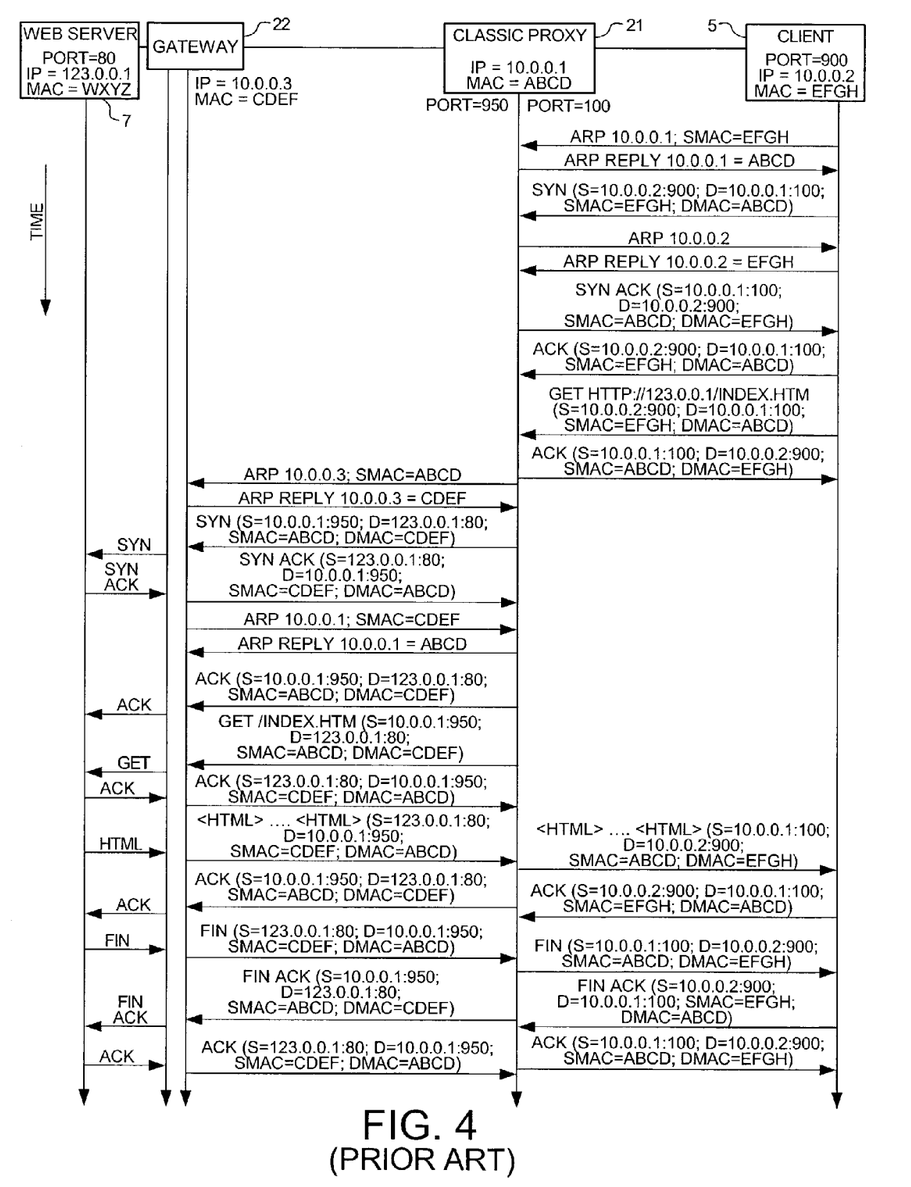
FIG. 4 (prior art) is a diagram showing protocol messages used to set up a TCP connection between the client and the web server of FIG. 3.

FIG. 4 (prior art) is a diagram showing the Ethernet/IP/TCP protocol messages used to retrieve the webpage 6 through classic proxy 21. FIG. 4 illustrates how a first TCP connection is established between client 5 and classic proxy 21. A second TCP connection is established between classic proxy 21 and web server 7. Inserting classic proxy 21 into LAN 2 involves reconfiguring client 5, and all other clients of LAN 2, to send their requests, for example, for webpage 6, to classic proxy 21. Moreover, messages from different clients appear all to come from the source IP address of classic proxy 21, as opposed to the individual source IP address of the relevant client. Reconfiguring each client requires a degree of networking skill and effort that makes this solution undesirable.

Figure 5:
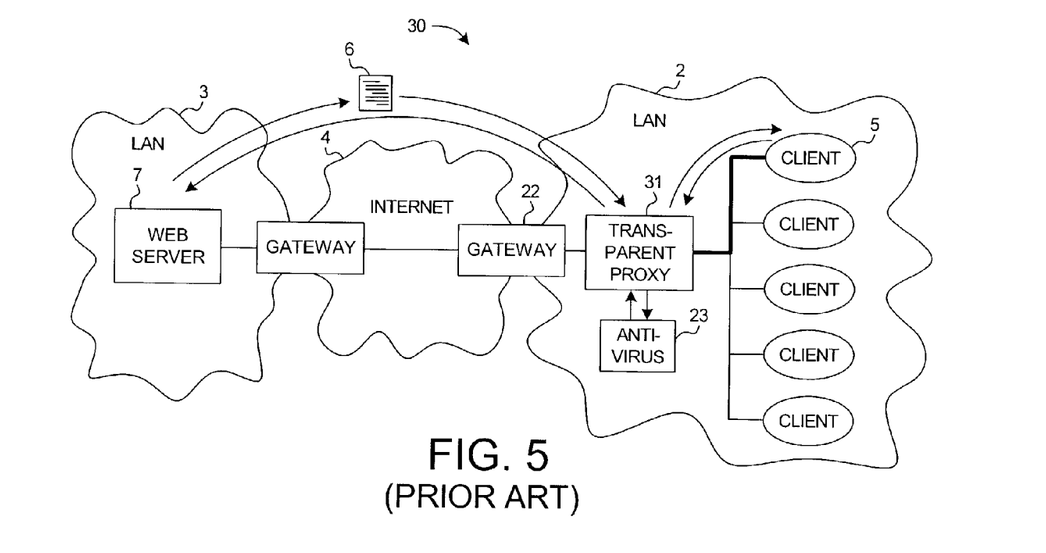
FIG. 5 (prior art) is a diagram of a client connected to a web server through a transparent proxy executing an anti-virus application.
Figure 6:
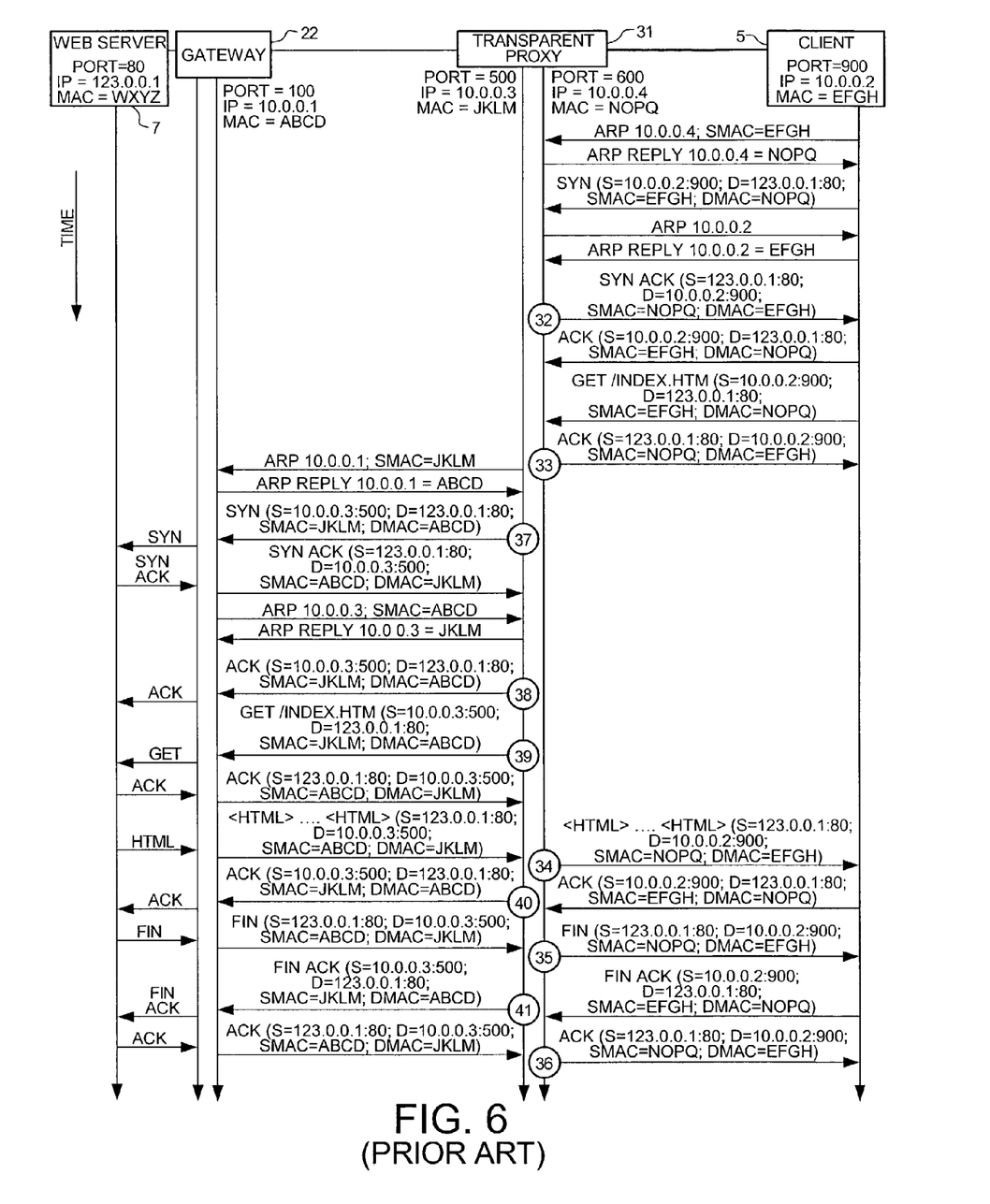
FIG. 6 (prior art) is a diagram showing protocol messages used to set up a TCP connection between the client and the web server of FIG. 6.

FIG. 5 (prior art) is a diagram of an internetwork 30, also including LANs 2 and 3 and Internet 4. A transparent proxy 31 is used instead of classic proxy 21. FIG. 6 (prior art) shows the Ethernet/IP/TCP protocol messages between client 5 and gateway 22. Less reconfiguration is involved when employing transparent proxy 31 than for classic proxy 21 because client 5 receives messages containing the source IP address of the gateway 22, instead of the source IP address of the transparent proxy 31. Client 5 can, therefore, return response messages to the gateway 22 without being reconfigured to send them through the transparent proxy 31.

Unfortunately, "transparent" proxy 31 is not transparent with respect to 48-bit Ethernet hardware addresses, also called MAC addresses. Consider the example where transparent proxy 31 is inserted into LAN 2 between client 5 and gateway 22. Client 5 requests webpage 6 from web server 7. Before the webpage 6 can be communicated, a first TCP connection must be established between web server 7 and transparent proxy 31, and a second TCP connection must be established between transparent proxy 31 and client 5. When Ethernet frames are received onto client 5 across the second TCP connection, they contain the source MAC address of the transparent proxy 31 and not the source MAC address of the gateway 22. Note in FIG. 6 (prior art) that messages 32 through 36 from the transparent proxy 31 to client 5 have source MAC addresses of the transparent proxy 31 (SMAC=NOPQ). This hinders client 5 from gathering the MAC addresses of other devices on LAN 2.

Moreover, the messages that gateway 22 receives from transparent proxy 31 include the source MAC address, as well as the source IP address, of the transparent proxy 31. Therefore, "transparent" proxy 31 is not transparent to web server 7. Web server 7 sees only the transparent proxy 31 and does not distinguish among messages from individual clients. Note in FIG. 6 that messages 37 through 41 have the source MAC address (JKLM) and the source IP address (10.0.0.3) of the transparent proxy 31. Thus, because the original sender of messages coming from transparent proxy 31 cannot be determined from the source IP and MAC addresses, customizing services towards individual clients is more difficult. Moreover, client 5, and the other clients on LAN 2, must still be reconfigured to some extent to send requests to the MAC address of the transparent proxy 31. Expertise and effort are therefore required to operate and maintain a LAN network where clients communicate through a proxy, even where the proxy is a so-called "transparent" proxy. This is undesirable.

SUMMARY

A multi-application transparent platform intercepts an incoming application file communicated from a source across a first TCP connection by terminating the first TCP connection on the multi-application transparent platform and supplying the application file to an application program. The application file is received onto the platform in the form of multiple incoming Ethernet frames. The application layer program analyzes the application file and identifies characteristics of the application file, such as virus content, that are not apparent in the individual Ethernet frames that carried the application file over the first TCP connection. The platform resends the application file over a second TCP connection in outgoing frames having the same IP addresses and Ethernet MAC addresses as the incoming frames.

Accordingly, the platform is transparent to the recipient of the frames, even though the first TCP connection was terminated on the platform. Response messages can, therefore, be sent by the recipient to the source of the incoming frames without reconfiguring the recipient to account for the Ethernet MAC address of the platform.

In one embodiment, a multi-application transparent platform terminates a first TCP connection only after determining that a second TCP connection can be established. The platform is the terminus of the first TCP connection and the origin of the second TCP connection. The platform establishes the first TCP connection by sending signaling messages having the source IP address and the source Ethernet MAC address of the terminus of the second TCP connection.

The platform can accept many requests from the origin of the first TCP connection before establishing the second TCP connection. Ethernet frames transmitted by the platform over the second TCP connection have the source IP address and the source Ethernet MAC address of the origin of the first TCP connection. Thus, the platform is transparent to both the origin of the first TCP connection and to the terminus of the second TCP connection.

In another embodiment, the multi-application transparent platform executes one or more application layer programs that analyze application files sent with SMTP, NNTP and other protocols. The application layer programs perform functions other than searching for viruses in application files, such as filtering out application files that contain a specified content. For example, the application files that are identified and filtered out can be voice communication data in which a specified word is spoken.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 7:
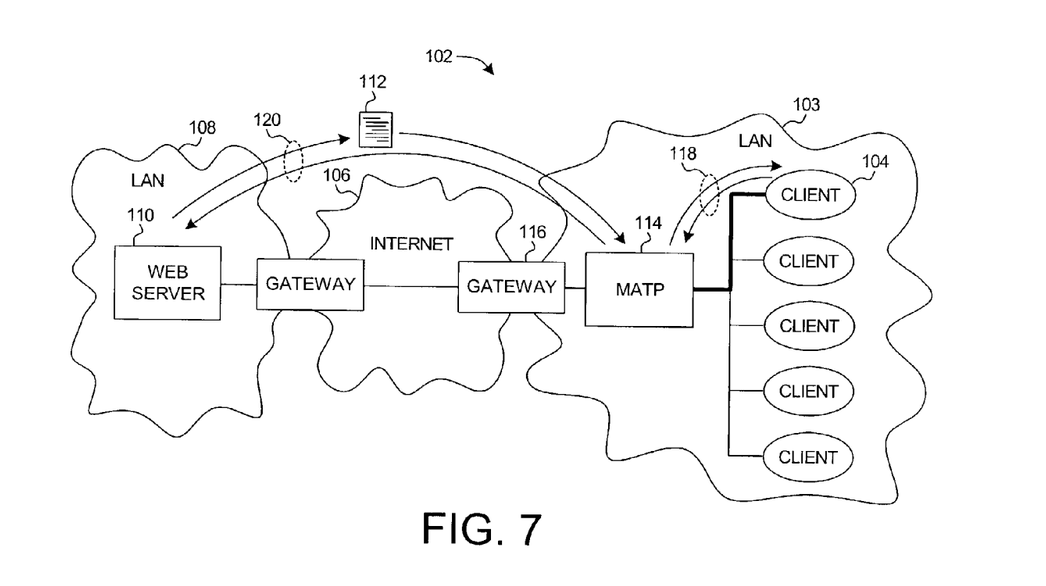
FIG. 7 is a diagram of a client connected to a web server through a multi-application transparent platform in accordance with an embodiment of the present invention.

Reference will now be made in detail to some embodiments of the invention, examples of which are illustrated in the accompanying drawings. FIG. 7 is a diagram of an internetwork 102 in which a LAN 103, including a client 104, is connected by Internet 106 to a LAN 108, including a web server 110. Client 104 wishes to retrieve a webpage 112 from web server 110. In order to retrieve webpage 112, client 104 begins by setting up a TCP connection. Web pages are generally transmitted via TCP connections. Client 104 knows the name of the web page to be received, for example, WebPages.com. Client 104 sends out a domain name system (DNS) request containing an ASCII string naming the webpage WebPages.com. A DNS server somewhere on Internet 106 returns the 32-bit IP address for WebPages.com, in this example 123.0.0.1.

Client 104 then sends out an address resolution protocol (ARP) request containing the IP address (10.0.0.1) of a gateway 116 asking for the corresponding 48-bit Ethernet hardware address, referred to as destination MAC address. Gateway 116 responds with its MAC address, in this example ABCD.

Figure 8:
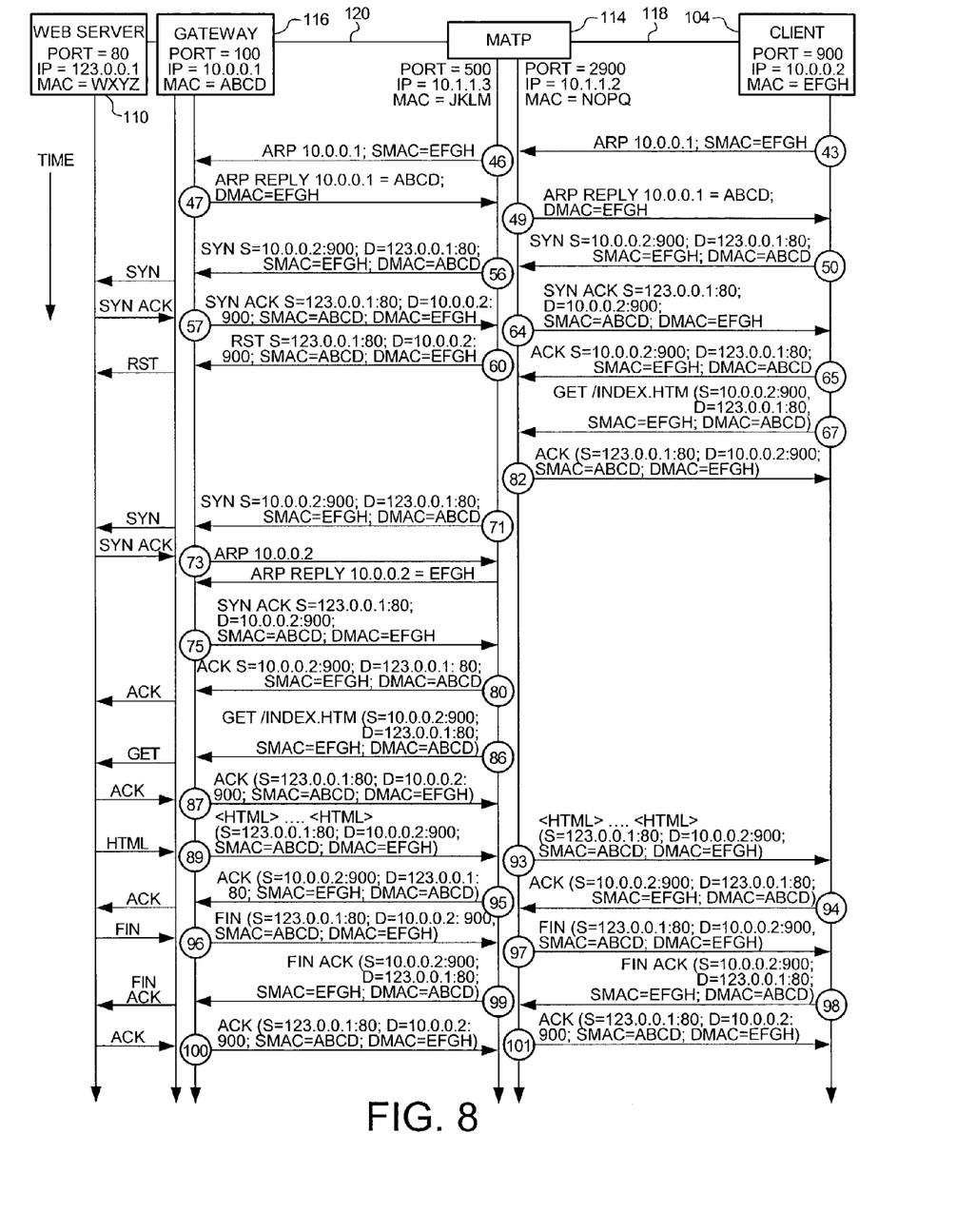
FIG. 8 is a diagram showing protocol messages used to set up TCP connections between the client and the web server of FIG. 7.

FIG. 8 illustrates the ARP and TCP messages used to set up TCP connections between client 104 and web server 110. The ARP and TCP messages travel through a multi-application transparent platform (MATP) 114 on their way between client 104 and web server 110. In this embodiment, two TCP connections are actually established: a first TCP connection 118 between client 104 and MATP 114, and a second TCP connection 120 between MATP 114 and web server 110.

Figure 9:
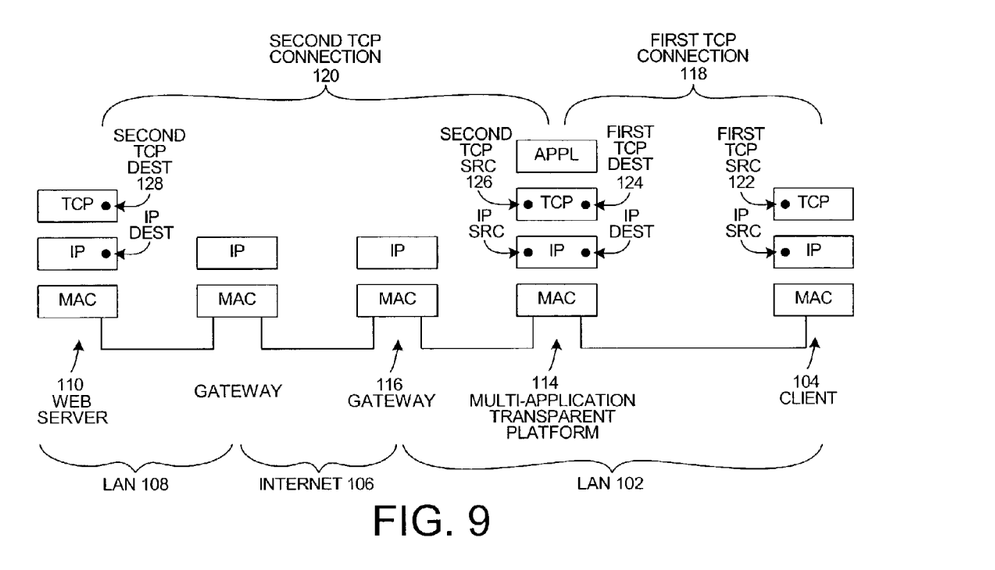
FIG. 9 is a diagram showing the protocol layers over which the TCP connections of FIG. 8 are established.

FIG. 9 shows the protocol layers over which the two TCP connections are established between client 104 and web server 110. The first TCP connection 118 is established between a first source TCP address 122 and a first TCP destination address 124. The second TCP connection 120 is established between a second source TCP address 126 and a second destination TCP address 128. TCP addresses are also called "TCP ports," which are not to be confused with physical ports.

Returning to FIG. 8, client 104 sends a SYN message 50 to web server 110 initiating the setup of a TCP connection. The SYN message 50 is intercepted by MATP 114, and MATP 114 responds to client 104 as though it were the gateway 116. Thus MATP 114 responds with a SYN ACK message 61 having a source IP address and a source MAC address of gateway 116, in this example 10.0.0.1 and ABCD, instead of the source IP address and the source MAC address of MATP 114, in this example 10.1.1.2 and NOPQ. MATP 114 is therefore transparent to client 104 because client 104 receives messages as though they were coming directly from gateway 116. Client 104 then responds to SYN ACK message 64 with an ACK message 65, thereby establishing the first TCP connection 118.

After the first TCP connection 118 has been established, client 104 makes a GET request 67 for an HTML document from the web server 110. MATP 114 now has a reason to establish the second TCP connection 120, which connects MATP 144 to the web server 110. MATP 114 sends a SYN message 71 having source and destination addresses identical to that of SYN message 50. MATP 114 receives a SYN ACK message 75 and sends an ACK message 80, thereby setting up the second TCP connection 120. MATP 114 inserts the source IP address and the source MAC address of client 104, in this example 10.0.0.2 and EFGH, in the messages MATP 114 sends to gateway 116. MATP 114 is therefore transparent to gateway 116 because gateway 116 receives messages as though they were coming directly from client 104.

MATP 114 is transparent in both directions because both client 104 and gateway 116 receive messages as though they were receiving the messages directly from the other. This is in contrast to transparent proxy 21 in FIG. 5 (prior art), which is transparent only with respect to IP addresses in the direction of client 5 (messages 32 through 36) and not transparent with respect to either IP addresses or MAC addresses in the direction of gateway 8 (messages 37 through 41).

After both TCP connections 118 and 120 are established, the web server 110 sends webpage 112 to client 104 in the form of an HTML document. The HTML document is divided into frame payloads, and each frame payload is sent in an individual Ethernet frame across the second TCP connection 120. Each Ethernet frame received by MATP 114 from gateway 116 contains the source IP address and the source MAC address of gateway 116, such as the frame illustrated as message 75 in FIG. 8.

The incoming frame payloads that arrive at MATP 114 in separate Ethernet frames are assembled at the TCP layer of MATP 114 to form an incoming TCP payload, which is the HTML document containing webpage 112. The incoming TCP payload is stored in a database in the MATP 114 and then sent to the application layer of MATP 114. The application layer analyzes the entire incoming TCP payload as a unit. For example, an application for examining contents transmitted according to HTTP protocol can execute in the application layer of the multi-application transparent platform (MATP) 114. The application examines the contents of webpage 112 that was sent in the form of an HTML document using HTTP protocol. The application looks for computer viruses and identifies all TCP payloads that contain viruses. In this way, TCP payloads containing computer viruses can be deleted before they are stored on client 104. Firewall 8 in FIG. 1, in comparison, can examine only individual Ethernet frames and cannot identify a computer virus that is distributed across many frames.

After the incoming TCP payload has been acted upon by an application, an identical outgoing TCP payload is formed. Alternatively, the incoming TCP payload that was stored in the database of MATP 114 can become the outgoing TCP payload. MATP 114 divides the outgoing TCP payload into outgoing frame payloads that are contained in separate Ethernet frames. The outgoing frames are sent across the first TCP connection 118 to client 104.

Each Ethernet frame received by client 104 from MATP 114 contains the source IP address and the source MAC address of gateway 116, such as the frame illustrated as message 80 in FIG. 8. Thus, the anti-virus application executed on the incoming TCP payload is carried out transparently. Client 104 receives frames having the same source IP address and source MAC address as the frames received by MATP 114. Client 104 receives frames as though MATP 114 is not between client 104 and gateway 116. Therefore, MATP 114 is transparent.

Figure 11:
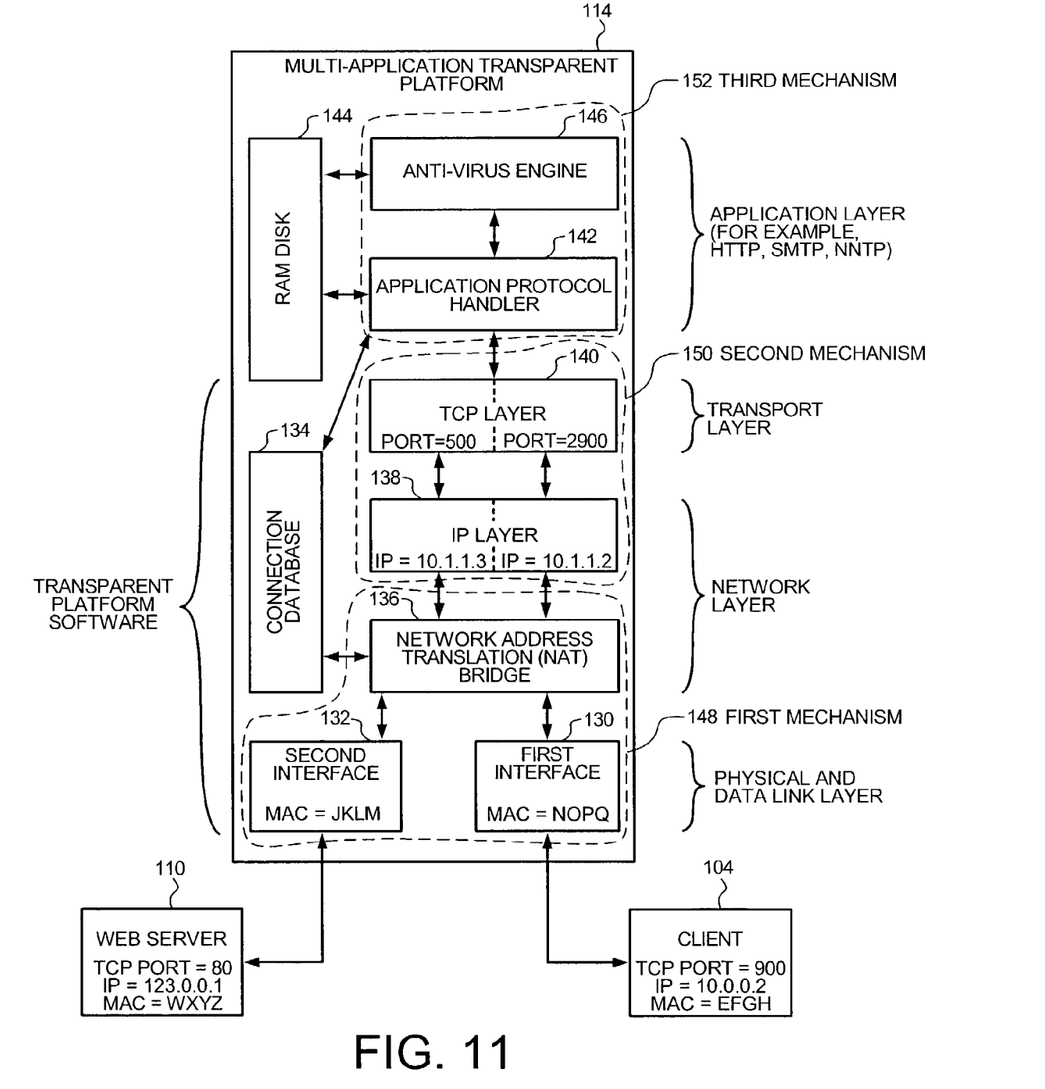
FIG. 11 is a block diagram showing the multi-application transparent platform of FIG. 7 in more detail.

FIG. 11 shows the components of the MATP 114 in more detail. The hardware platform of MATP 114 is an Intel personal computer that executes a Microsoft Windows operating system. As ARP and TCP messages are received by MATP 114, they are processed at various layers in the MATP. For example, the ARP request 43 sent out by client 104 requesting the MAC address corresponding to the IP address of gateway 116 (10.0.0.1) is received by a first interface 130 and forwarded to a network address translation bridge (NAT) 136. The first interface 130, as well as a second interface 132, can be network interface cards (NIC), each having its own MAC address.

Figure 12:
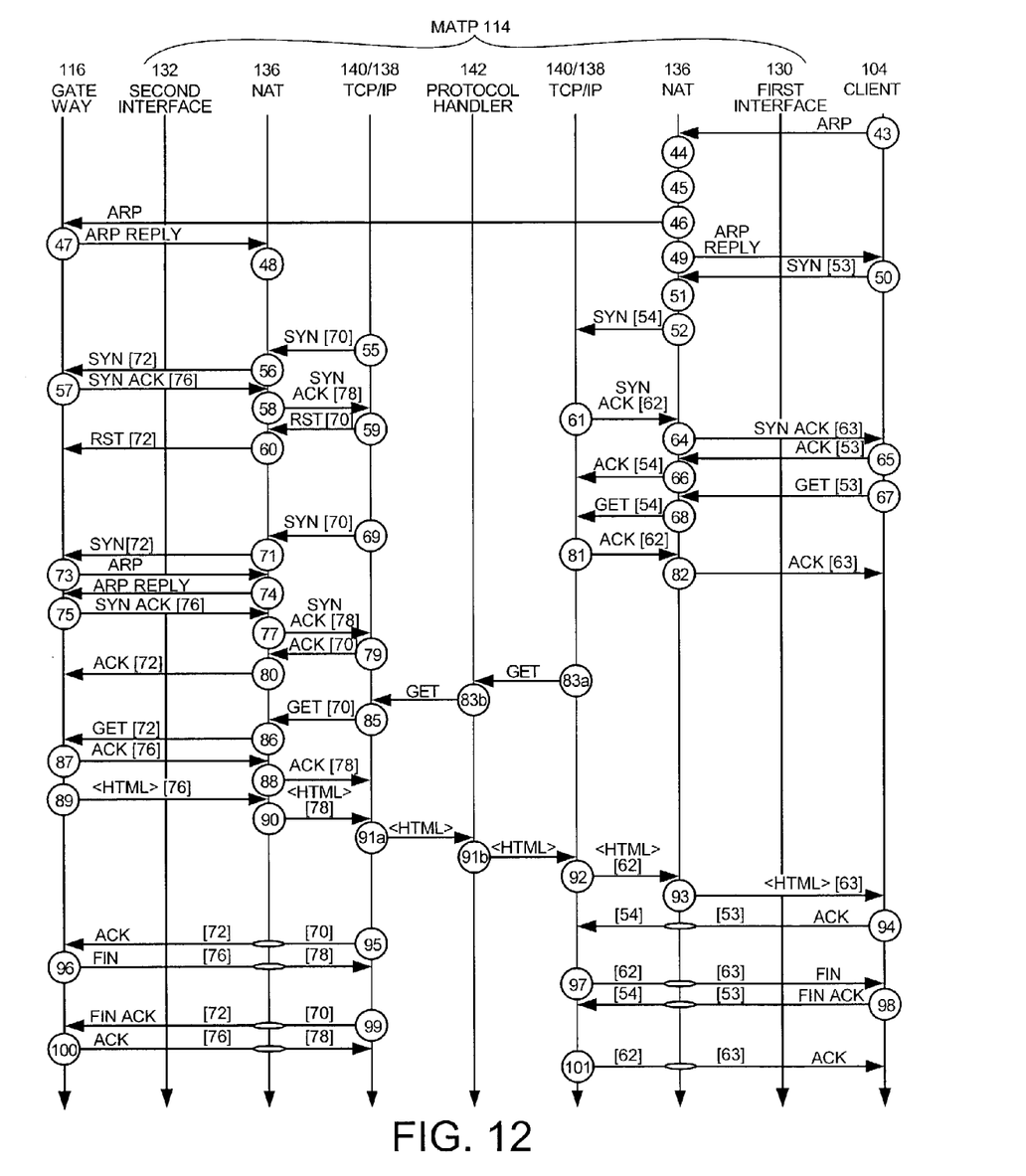
FIG. 12 is a diagram showing some steps of the operation of the multi-application transparent platform and its components.

FIG. 12 illustrates steps in the operation of the components of MATP 114. The combined operation of a network address translation bridge in a transparent load balancer and a separate multi-application platform is disclosed in U.S. patent application Ser. No. 10/252,061, entitled "Transparent Load Balancer For Network Connections," filed on Sep. 20, 2002 by Smith et al., (the subject matter of which is hereby incorporated by reference).

Upon receiving ARP request 43, as shown in FIG. 12, the NAT 136 sends to a connection database 134 the fact that MAC address EFGH is connected to interface 130 with MAC address NOPQ. (Step 44) MATP 114 then searches for IP address 10.0.0.1 in connection database 134. (Step 45) In this example, 10.0.0.1 has not yet been entered into connection database 134. MATP 114 then sends an ARP request 46 via the second interface 132 to gateway 116. NAT 136 has given ARP request 46 the source MAC address EFGH of client 104, even though the MAC address of interface 132 is JKLM. ARP request 46 is used to check whether an Ethernet connection can be set up with gateway 116 before an ARP reply is returned to client 104. Gateway 116 returns ARP REPLY 47 via the second interface 132 to NAT 136. Besides confirming that a connection can be set up with gateway 116, ARP REPLY 47 also returns the MAC address (ABCD) corresponding to the IP address of gateway 116.

The fact that MAC address ABCD can be reached through interface 132 with MAC address JKLM is added into connection database 134. (Step 48) MATP 114 then sends an ARP REPLY message 49 via the first interface 130 to client 104. ARP REPLY message 49 is also shown in FIG. 8. ARP reply 49 has the source MAC address ABCD of gateway 116, even though the MAC address of interface 130 is NOPQ. This translation is accomplished by NAT 136.

Client 104 now sends SYN message 50 shown in FIGS. 8 and 12 to initiate the setup of a TCP connection with web server 110. MATP 114 intercepts setup messages from both client 104 and web server 110 and forms the first TCP connection 118 with client 104 and the second TCP connection 120 with web server 110. NAT 136 receives SYN message 50 via interface 130. MATP 114 recognizes that in a later step it will scan a document sent with HTTP protocol because the destination IP address (123.0.0.1:80) of SYN message 50 contains a TCP port 80, which denotes an HTTP-type TCP connection. In step 51, the fact that IP address 10.0.0.2:900 wants to connect to IP address 123.0.0.1:80 is entered into connection database 134.

NAT 136 translates TCP and IP addresses of SYN message 50 before forwarding an internal SYN message 52 to the TCP/IP layers 140 and 138, as shown in FIG. 11. NAT 136 inserts an internal destination IP address and an internal TCP port in order to route message 52 to an internal IP address 10.1.1.2 on IP layer 138 and to an internal port 2900 on TCP layer 140.

Figure 13:
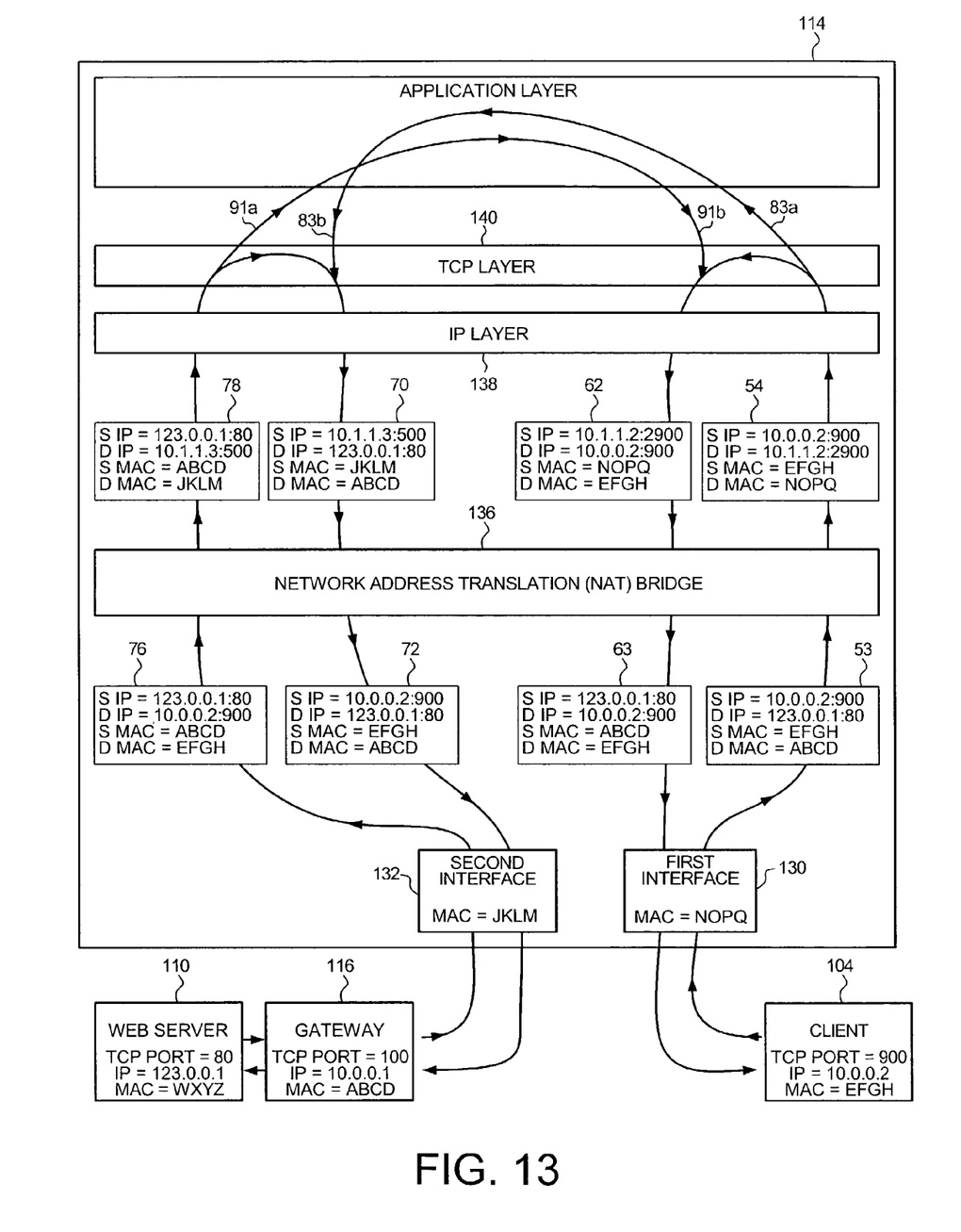
FIG. 13 is a diagram illustrating the address blocks of messages sent between layers of the multi-application transparent platform.

FIG. 13 shows the address blocks of messages sent between layers of MATP 114. All messages received from client 104 related to the first TCP connection 118 have address block 53 [S IP=10.0.0.2:900; D IP=123.0.0.1:80; SM=EFGH; DM=ABCD]. NAT 136 translates address block 53 into the internal addresses of address block 54 [S IP=10.0.0.2:900; D IP=10.1.1.2:2900; SM=EFGH; DM=NOPQ]. Internal messages from NAT 136 to TCP layer 140 responding to messages from client 104 have address block 54. Note that the destination MAC address of address block 54 is the MAC address of the first interface 130.

TCP/IP layers 138 and 140 generate a SYN message 55 in response to receiving message 52. SYN message 55 is sent to NAT 136, which forwards a SYN message 56 to web server 110 to confirm that the second TCP connection 120 can be set up. The setup of the second TCP connection 120, however, is not initiated at this time. After MATP 114 receives a SYN ACK message 57 via gateway 116 from web server 110, which confirms that a TCP connection can be established with web server 110, NAT 136 forwards a SYN ACK message 58 to TCP/IP layers 138 and 140. Then the TCP/IP layers 138 and 140 return a RST or a NACK message to web server 110. In FIG. 12, TCP/IP layers 138 and 140 send an RST message 59 to NAT 136, which forwards an RST message 60 via gateway 116 to web server 110. RST message 60 resets the setup process, and no TCP connection in established. Alternatively, MATP 114 can send a NACK message that gives a negative acknowledgement to SYN ACK message 57 sent by web server 110.

After TCP/IP layers 138 and 140 receive SYN ACK 58 confirming that the second TCP connection 120 can be established, TCP/IP layers 138 and 140 generate a SYN ACK message 61 in order to set up the first TCP connection 118 with client 104. Message 61 has an address block 62 [S IP=10.1.1.2:2900; D IP=10.0.0.2:900; SM=NOPQ; DM=EFGH]. Messages from TCP/IP layers 138 and 140 to NAT 136 bound for client 104 have address block 62. Note that the source MAC address of address block 62 is the MAC address of the first interface 130.

NAT 136 receives message 61 and translates address block 62 into an address block 63 [S IP=123.0.0.1:80; D IP=10.0.0.2:900; SM=ABCD; DM=EFGH]. NET 136 sends SYN ACK message 64 with address block 63 via interface 130 to client 104. All messages sent to client 104 by NAT 136 that are related to the first TCP connection 118 have address block 63. Message 64 does not have the source MAC address of interface 130, which would normally be required using Ethernet protocol. Address block 63 of message 64 includes the source MAC address of gateway 116 (ABCD) and the source IP address of web server 110 (123.0.0.1:80), thereby rendering MATP 114 transparent to client 104. Message 64 seems to come directly from gateway 116.

Client 104 responds to SYN ACK message 64 with an ACK message 65. NAT 136 receives ACK message 65 with address block 53 and generates message 66, having address block 54. Message 66 is forwarded to TCP layer 140. SYN messages 50 and 52, SYN ACK messages 61 and 64 and ACK messages 65 and 66 thereby establish the first TCP connection 118 between client 104 and TCP layer 140. The first TCP connection 118 terminates in the TCP layer 140, and the TCP layer assembles all of the frame payloads of individual Ethernet frames that relate to the TCP connection to form a complete application file. The application protocol handler 142, shown in FIG. 11, can then execute on the complete application file. In this example, however, ACK message 65 does not carry a frame payload that is part of an application file for which handling by protocol handler 142 is undertaken. In establishing the first TCP connection 118, client 104 communicates with MATP 114 as though client 104 is connected directly to gateway 116.

After establishing the first TCP connection 118, MATP 114 waits for client 104 to make a request of web server 110 before initiating the setup of the second TCP connection 120 between MATP 114 and web server 110. The request comes when client 104 sends a GET message 67 requesting that web server 110 transmit a particular document using HTTP protocol. An example of the syntax of GET message 67 is shown in FIG. 8. NAT 136 receives GET message 67 having an address block 53 and forwards a GET message 68 having an address block 54 to the TCP/IP layers 138 and 140.

Upon receiving GET message 68, the TCP/IP layers 138 and 140 generate three new messages: SYN message 69, ACK message 81 and GET message 83a. SYN message 69 has address block 70 [S IP=10.1.1.3:500; D IP=123.0.0.1:80; SM=JKLM; DM=ABCD]. Messages from TCP/IP layers 138 and 140 to NAT 136 bound for web server 110 have address block 70. Note that the source MAC address of address block 70 is the MAC address of the second interface 132. Address block 70 contains the internal IP address (10.1.1.3) and the internal TCP port (500) that are used to establish the second TCP connection 120 to IP address 123.0.0.1:80. Block 54, on the other hand, contains the internal IP address (10.1.1.2) and the internal TCP port (2900) that are used for the first TCP connection 118.

NAT 136 receives SYN message 69 and forwards SYN message 71 having address block 72 via gateway 116 to web server 110. NAT 136 determines from the connection database 134 that IP address 10.0.0.2:900 wants to connect to IP address 123.0.0.1:80. This information was entered into database 134 in step 51. Thus, NAT 136 translates address block 70 of message 69 into address block 72 [S IP=10.0.0.2:900; D IP=123.0.0.1:80; SM=EFGH; DM=ABCD] of message 71. All messages sent to web server 110 by NAT 136 that are related to the second TCP connection 120 have address block 72. Message 71 does not have the source MAC address of interface 132, which would normally be required using Ethernet protocol. Address block 72 of message 71 includes the source IP and MAC addresses of client 104 (10.0.0.2:900; EFGH), thereby rendering MATP 114 transparent to web server 110. Message 71 seems to come directly from client 104.

SYN message 71 is sent through gateway 116 to web server 110. Before gateway 116 proceeds in setting up the second TCP connection 120, it can send an ARP message 73 to obtain the MAC address of client 104, if gateway 116 has not obtained this information through other means. NAT 136 responds to ARP message 73 with ARP REPLY 74 that includes the MAC address of client 104 (EFGH).

SYN message 71 is transmitted through the Internet 106, and ultimately a SYN ACK message is received by gateway 116 acknowledging that web server 110 received SYN message 71. Gateway 116 sends a SYN ACK message 75 having an address block 76 through the second interface 132 to NAT 136. All messages received from web server 110 via gateway 116 related to the second TCP connection 120 have address block 76 [S IP=123.0.0.1:80; D IP=10.0.0.2:900; SM=ABCD; DM=EFGH]. NAT 136 translates TCP and IP addresses of SYN ACK message 75 before forwarding an internal SYN ACK message 77 to the TCP/IP layers 140 and 138. NAT 136 routes message 77 to an internal IP address 10.1.1.3 on IP layer 138 and to an internal port 500 on TCP layer 140. Message 77 has address block 78 [S IP=123.0.0.1:80; D IP=10.1.1.3:500; SM=ABCD; DM=JKLM]. Internal messages from NAT 136 to TCP layer 140 responding to messages via gateway 116 from web server 110 have address block 78. Note that the destination MAC address of address block 78 is the MAC address of the second interface 132.

In response to SYN ACK message 77, TCP/IP layers 138 and 140 generate an ACK message 79 in order to set up the second TCP connection 120 with web server 110. Message 77 has address block 70. NAT 136 receives ACK message 79 and generates ACK message 80 with address block 72. ACK message 80 is sent via interface 132, gateway 116 and internet 106 to web server 110. SYN messages 69 and 71, SYN ACK messages 75 and 77 and ACK messages 79 and 80 thereby establish the second TCP connection 120 between TCP layer 140 and web server 110. The second TCP connection 120 is terminated in the TCP layer 140 of MATP 114.

The second message generated by TCP/IP layers 138 and 140 upon receiving GET message 68 is ACK message 81. ACK message 81 has address block 62 and acknowledges that GET message 67 has been received. NAT 136 receives message 81 and generates ACK message 82 with address block 63. ACK message 82 is sent to client 104 and has the source MAC address of gateway 116 and the source IP address of web server 110. In this embodiment, TCP/IP layers 138 and 140 send ACK message 81 in response to receiving GET message 68. In another embodiment, TCP/IP layers 138 and 140 wait to send ACK message 81 until ACK message 79 has been sent. This ensures that at least the entire TCP connection (connection 118 and connection 120) has been established before acknowledgement is sent to client 104 that its GET message has been received over that TCP connection.

The third message generated by the TCP/IP layers 138 and 140 upon receiving GET message 68 is GET message 83a. TCP layer 140 sends messages potentially containing data to be processed, such as GET messages and messages containing HTML documents, to the application layer. TCP layer 140 sends GET message 83a to application protocol handler 142. Protocol handler 142 then generates a GET message 83b and routes message 83b to the internal port 500 on TCP layer 140 and to the internal IP address 10.1.1.3 on IP layer 138.

Once the second TCP connection 120 has been established, TCP/IP layers 138 and 140 forward GET message 83b as GET message 85 to NAT 136. GET message 85 has address block 70 and contains the same GET request as in GET message 68. NAT 136 receives GET message 85 and generates GET message 86 with address block 72, which is sent via interface 132 to web server 110. Web server 110 acknowledges GET message 86 with an ACK message 87. NAT 136 receives ACK message 87 with an address block 76 and forwards an ACK message 88 with an address block 78 to TCP/IP layers 138 and 140.

Web server 110 then sends the requested HTML document to client 104. The requested HTML document is contained in message 89 that is forwarded by gateway 116 via interface 132 to NAT 136. NAT 136 sends the HTML document in message 90 having address block 78 to TCP/IP layers 138 and 140. In this example, the entire document is delivered in the frame payload of message 90. In another embodiment, the frame payloads of multiple Ethernet frames together comprise an application file, for example, an entire HTML document. TCP layer 140 recognizes that message 90 conforms to HTTP protocol. One way that TCP layer 140 identifies that message 90 conforms to HTTP protocol is by recognizing that its source IP address in address block 78 contains port 80, which is commonly used to send HTTP messages.

TCP/IP layers 138 and 140 then forward message 90 as message 91a to application protocol handler 142. Message 91a includes the application file, as well as information regarding the type of application file. Protocol handler 142 stores the application file in database 144, which can be a RAM disk. Protocol handler 142 causes an anti-virus engine 146 to execute an application layer program on the application file. In this example, the application layer program searches for computer viruses in HTML documents sent using HTTP protocol.

In other embodiments, the application layer program searches for computer viruses in application files sent with SMTP, NNTP or other protocol messages. Moreover, application layer programs can perform functions other than searching for viruses in application files. For example, a filter program in the application layer of MATP 114 can perform the same function as a filtering firewall. One such filter program searches for specific words in HTML documents and instructs the protocol handler 142 not to forward messages with frame payloads that include parts of an application file containing offending HTML documents.

If the anti-virus engine 146 does not find a computer virus in the application file contained in message 91a, i.e., the HTML document, then protocol handler 142 creates a new message 91b containing the same application file. Message 91b is sent to TCP layer 140 through a socket that has been assigned by TCP layer 140 for use with internal TCP port 2900 and the first TCP connection 118. TCP/IP layers 138 and 140 then generate a message 92 containing the HTML document and having address block 60. TCP/IP layers 138 and 140 send message 92 to NAT 136. NAT 136 forwards message 92 as message 93 having address block 61 to client 104. The HTML document is thereby received transparently by client 104 as through it came directly from web server 110.

Figure 10:
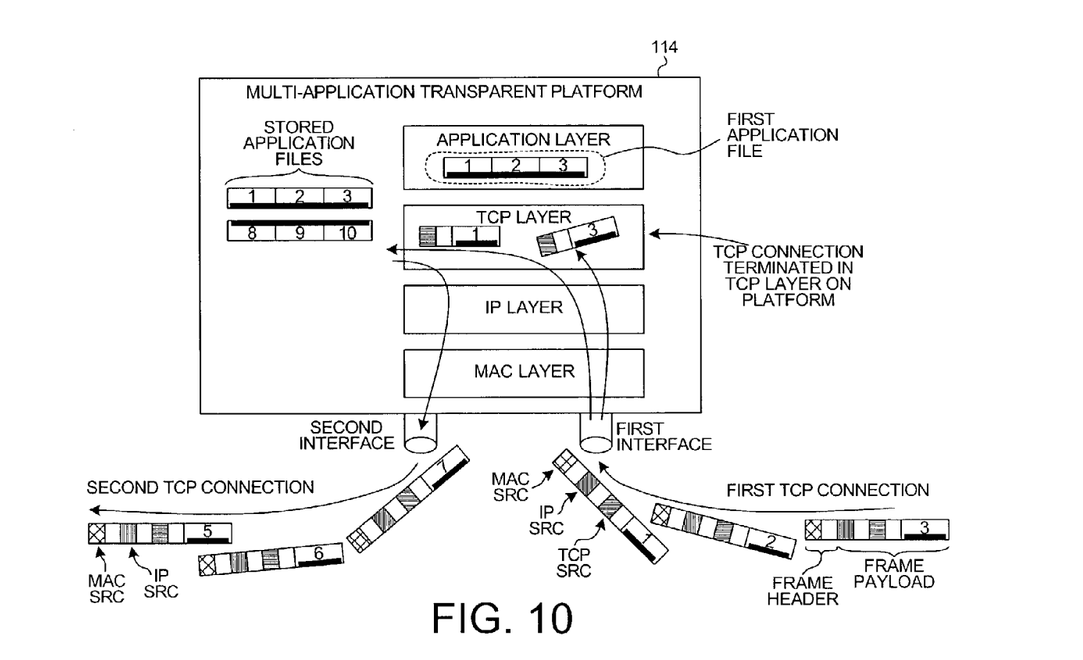
FIG. 10 is a diagram illustrating how Ethernet frames are received, operated on and transmitted by the multi-application transparent platform.

FIG. 10 illustrates how MATP 114 receives Ethernet frames, assembles an application file, and transmits other Ethernet frames containing the same application file. The TCP segments that make up message 92 in FIG. 12 do not necessarily contain payloads of the application file that are the same size as the payloads of the TCP segments that comprised message 90. As illustrated in FIG. 10, payloads 1, 2 and 3 make up a first application file. The first application file can be broken up and transmitted in other Ethernet frames having payloads 5, 6 and 7. Payload 5 is not necessarily the same size as payload 1, payload 6 is not necessarily the same size as payload 2, and so forth.

Returning to FIG. 12, client 104 acknowledges receipt of the requested HTML document with ACK message 94. MATP 114 receives message 94, modifies its addresses and delivers the ACK message to TCP layer 140 in an analogous manner to that of messages 65 and 66. TCP layer 140 sends ACK message 95 to web server 110 analogously to the manner of sending messages 79 and 80. Web server 110 sends a FIN message that is forwarded by gateway 116 as FIN message 96. FIN message 96 indicates that the entire requested HTML document has been sent and that the TCP connection is to be terminated. TCP layer 140 sends FIN message 97 to client 104. Client 104 responds with a FIN ACK message 98, which TCP layer 140 forwards as FIN ACK message 99 to web server 110. The web server 110 terminates the TCP connection by sending an ACK message. Gateway 116 forwards the ACK message as ACK message 100 to TCP layer 140, which forwards ACK message 101 to client 104.

The receipt of ACK message 100 by TCP layer 140 terminates the second TCP connection 120. The receipt of ACK message 101 by client 104 terminates the first TCP connection 118. Once TCP layer 140 receives FIN message 96, the timing for sending messages to terminate the first TCP connection 118 need not depend on the times at which messages to terminate the second TCP connection 120 are received by the TCP layer 140.

Although the application file referred to in the embodiment described above is a file based on a Microsoft operating system, in other embodiments the application file is the sum of the payloads of frames communicated across the connections terminated on the MATP 114. The sum of the payloads can be an accumulation of data, such as an ongoing stream of voice data from a conversation. The MATP 114 can analyze discrete portions of the accumulation of data without the MATP 114 being aware of the beginning or ending of the stream of voice data.

In another embodiment, the various layers shown in FIG. 11 operate on different processors or central processing units. A first mechanism 148 receives incoming Ethernet frames that are communicated across the first TCP connection. The first mechanism 148 translates MAC addresses and IP addresses of the incoming Ethernet frames in the network address translation (NAT) bridge 136. A second mechanism 150 includes the IP layer 138 and the TCP layer 140, which both operate or execute on the same processor upon which the NAT 136 operates or executes. The first TCP connection terminates on the second mechanism 150. Each of the incoming frames contains a frame payload that together comprise an application file.

The second mechanism 150 passes the application file to a third mechanism 152 that has an application layer program. The application layer program operates on a processor different than the one upon which the first mechansim 148 and the second mechansim 150 operate. The application layer program operates on the application file.

Based on the results of running the application layer program on the application file, the second mechanism 150 creates outgoing frames each containing a frame payload that together comprise the application file. The second mechanism 150 originates a second TCP connection over which the outgoing frames are communicated. The second TCP connection and the outgoing frames communicated over it are illustrated in FIG. 10. Each of the outgoing frames has a source IP address that is identical to the source IP address of the incoming frames. Each of the outgoing frames has a source MAC address that is identical to the source MAC address of the incoming frames. The first mechanism 148 (see FIG. 11) outputs the outgoing frames.

In yet another embodiment, the first mechanism 148 and the second mechanism 150 are on a separate physical device from the device containing the third mechanism 152.

In one embodiment, each MATP executing in the field automatically polls a predetermined URL to determine whether the transparent platform software and/or the application layer program and/or virus pattern files should be updated. If a central authority determines that either the transparent platform software or the application layer program or a pattern file should be updated, then the appropriate software is automatically communicated via the network from the central authority to the MATP in the field and the new software is loaded and run.

Although the present invention has been described in connection with certain specific embodiments for instructional purposes, the present invention is not limited thereto. In one specific embodiment, for example, the timing for sending signaling messages, e.g., SYN, SYN ACK, ACK and GET, with respect to the first TCP connection is largely independent of when signaling messages are sent with respect to the second TCP connection. In another embodiment, for example, the multi-application transparent platform is not based on Ethernet, IP and TCP layers, but rather on other protocol layers (for example, a packet radio data link layer and a UDP transport layer). Although an embodiment of the present invention is described in connection with analyzing a file, the present invention is not limited thereto. A platform in accordance with some embodiments analyzes non-file data payloads communicated by a lower layer transport layer protocol. Although the program that analyzes the data payloads is described in the examples above as an application layer program, the program can be over another layer higher than the transport layer. The program could, for example, be a session and/or presentation and/or application layer program if the OSI model is being used to described the program.

In one embodiment, the non-file data payload is a voice communication, and the application layer program includes voice recognition software such that the voice communication is converted into streaming text data. The resulting streaming text data is then analyzed by the application layer program. In this way, the application layer program may be configured to detect a particular pattern of spoken words in the voice communication.

Accordingly, various modifications, adaptations, and combinations of various features of the described embodiments can be practiced without departing from the scope of the invention as set forth in the claims.

What is claimed is:

1. A platform, comprising:
a first interface that receives a plurality of first incoming frames, each of the first incoming frames carrying a frame payload, the frame payloads of the first incoming frames together comprising a first application file, the first application file being communicated across a first TCP connection, each of the first incoming frames having an incoming source IP address and an incoming source MAC address;
an application layer program that executes on the platform;
a mechanism that terminates the first TCP connection on the platform wherein the first application file is supplied to the application layer program, the mechanism generating a plurality of first outgoing frames, each of the first outgoing frames carrying a frame payload, the frame payloads of the first outgoing frames together comprising the first application file, each of the first outgoing frames having an outgoing source IP address that is identical to the incoming source IP address, each of the first outgoing frames having an outgoing source MAC address that is identical to the incoming source MAC address; and
a second interface that outputs the first outgoing frames.

2. The platform of claim 1, wherein the second interface has a MAC address that is different than the incoming source MAC address, and wherein the second interface has an IP address that is different than the incoming source IP address.

3. The platform of claim 1, wherein the first application file is stored on the platform, the application layer program examines the first application file, and the first application file is used to generate the first outgoing frames.

4. The platform of claim 1, wherein the first application file is a data accumulation representing a voice communication.

5. The platform of claim 1, wherein the first TCP connection is defined by a first TCP source port and a first TCP destination port,
and wherein the first outgoing frames are output from the second interface across a second TCP connection, the second TCP connection being defined by the same first TCP source port and the same first TCP destination port.

6. The platform of claim 5, wherein the first interface and the second interface are physical network connections, wherein the first TCP connection extends into the platform across the first interface, and wherein the second TCP connection extends from the platform across the second interface.

7. The platform of claim 5, wherein the platform determines that the second TCP connection can be established before the mechanism terminates the first TCP connection.

8. The platform of claim 5, wherein the first interface receives a plurality of second incoming frames, each of the second incoming frames carrying a frame payload, the frame payloads of the second incoming frames together comprising a second application file, the second application file being communicated across the first TCP connection, each of the second incoming frames having the incoming source IP address and the incoming source MAC address; and wherein the second application file is supplied to the application layer program, the mechanism generates a plurality of second outgoing frames, and the second interface outputs the second outgoing frames, each of the second outgoing frames carrying a frame payload, the frame payloads of the second outgoing frames together comprising the second application file, each of the second outgoing frames having an outgoing source IP address that is identical to the incoming source IP address, each of the second outgoing frames having an outgoing source MAC address that is identical to the incoming source MAC address.

9. A method, comprising:

receiving a plurality of first incoming frames, each of the first incoming frames carrying a frame payload, the frame payloads of the first incoming frames together comprising a first application file, the first application file being communicated across a first TCP connection, each of the first incoming frames having an incoming source IP address and an incoming source MAC address; terminating the first TCP connection;

executing an application layer program on the first application file;

generating a plurality of first outgoing frames, each of the first outgoing frames carrying a frame payload, the frame payloads of the first outgoing fames together comprising the first application file, each of the first outgoing frames having an outgoing source IP address that is identical to the incoming source IP address, each of the first outgoing frames having an outgoing source MAC address that is identical to the incoming source MAC address; and outputting the first outgoing frames.

10. The method of claim 9, further comprising:

terminating a second TCP connection, wherein the outgoing frames are output across the second TCP connection, the first TCP connection being defined by a first TCP source port and a first TCP destination port, the second TCP connection being defined by the same first TCP source port and the same first TCP destination port.

11. The method of claim 10, further comprising:

receiving a plurality of second incoming frames, each of the second incoming frames carrying a frame payload, the frame payloads of the second incoming frames together comprising a second application file, the second application file being communicated across the first TCP connection, each of the second incoming frames having an incoming source IP address and an incoming source MAC address;

executing the application layer program on the second application file;

generating a plurality of second outgoing frames, each of the second outgoing frames carrying a frame payload, the frame payloads of the second outgoing frames together comprising the second application file, each of the second outgoing frames having an outgoing source IP address that is identical to the incoming source IP address, each of the second outgoing frames having an outgoing source MAC address that is identical to the incoming source MAC address; and outputting the second outgoing frames.

12. A system, comprising:

a first mechanism that receives a plurality of first incoming frames, each of the first incoming frames carrying a frame payload, the frame payloads of the first incoming frames together comprising a first application file, the first application file being communicated across a first TCP connection, each of the first incoming frames having an incoming source IP address and an incoming source MAC address; and a second mechanism that terminates the first TCP connection, the second mechanism generating a plurality of first outgoing frames, each of the first outgoing frames carrying a frame payload, the frame payloads of the first outgoing frames together comprising the first application file, each of the first outgoing frames having an outgoing source IP address that is identical to the incoming source IP address, each of the first outgoing frames having an outgoing source MAC address that is identical to the incoming source MAC address, the first mechanism outputting the first outgoing frames.

13. The system of claim 12, wherein the first mechanism comprises network address translation software executing on a first processor, and the second mechanism comprises TCP and IP software executing on the first processor.

14. The system of claim 12, further comprising:

a third mechanism having an application layer program, the third mechanism receiving the first application file from the second mechanism, the application layer program executing on the first application file.

15. The system of claim 14, wherein the application layer program executes on a second processor.

16. A platform, comprising:

a first interface that receives a plurality of incoming frames, each of the incoming frames carrying a frame payload, the frame payloads of the incoming frames together comprising a data payload, the data payload being communicated across a first TCP connection, each of the incoming frames having an incoming source IP address and an incoming source MAC address;

a program that analyzes the data payload, the program being of a network layer higher than the transport layer;

a mechanism that terminates the first TCP connection on the platform such that the data payload is supplied to the program, the mechanism generating a plurality of outgoing frames, each of the outgoing frames carrying a frame payload, the frame payloads of the outgoing frames together comprising the data payload, each of the outgoing frames having an outgoing source IP address that is identical to the incoming source IP address, each of the outgoing frames having an outgoing source MAC address that is identical to the incoming source MAC address; and a second interface that outputs the outgoing frames.

17. The platform of claim 16, wherein the data payload is taken from the group consisting of: streaming video data, and streaming voice data.

18. The platform of claim 16, wherein the data payload is a file, and wherein the program is an application layer program that analyzes the file.

19. The platform of claim 16, wherein the data payload is a web page that references a plurality of files, and wherein the program analyzes each of the plurality of files.

20. The platform of claim 16, wherein the data payload is a voice communication, and wherein the program converts the voice communication into a stream of text data, and wherein the program then analyzes the stream of text data to identify a particular pattern of spoken words in the voice communication.

* * * * *